Figure 1:
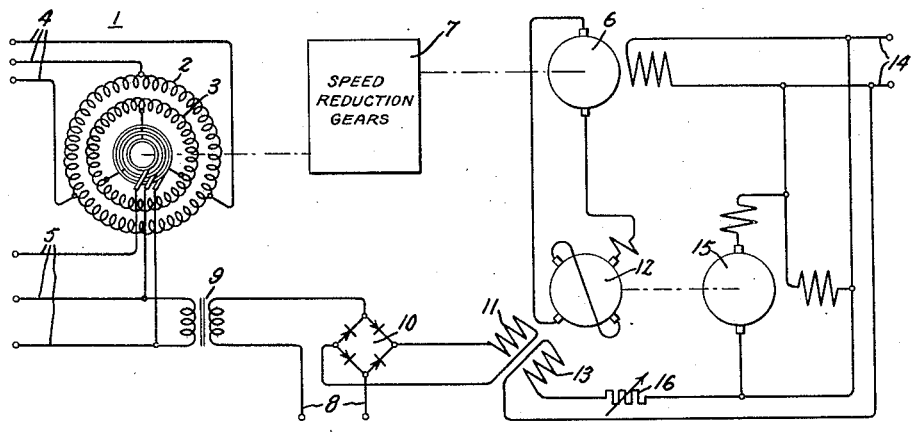

March 21, 1950     T. T. SHORT     2,501,543

FREQUENCY REGULATING SYSTEM

Filed Nov. 29, 1947

Inventor:
Thomas T. Short,
by Orwell P. Mack
His Attorney.

Patented Mar. 21, 1950

2,501,543

UNITED STATES PATENT OFFICE 2,501,543

FREQUENCY REGULATING SYSTEM

Thomas T. Short, Schenectady, N. Y., assignor to General Electric Company, a corporation of New York Application November 29, 1947, Serial No. 788,791

3 Claims. (Cl. 321—61)

My invention relates to frequency regulating systems for regulating the frequency in an alternating current distribution system.

In many cases, particularly that of electric power stations, it is necessary to have a source of electric power whose frequency is accurately controlled for the operation of clocks and other auxiliary devices. This power requirement may be as great as several kilowatts, in which case it is not feasible to obtain it directly from such sources as tuning-fork controlled amplifiers.

According to my invention, electric power is supplied to a controlled-frequency alternating-current distribution system or distribution bus through an induction frequency converter having stator and rotor windings respectively connected to the distribution system and to a polyphase alternating-current source. If such stator and rotor windings have equal numbers of eletromagnetic poles, as is usually preferable, then when the frequency converter rotor is held immobile the frequency in the distribution system equals the frequency of the source, and when the rotor is rotated the frequencies differ in a sense depending upon the direction of such rotation and by an amout equal to the electrical angular velocity of the rotor divided by 2π. Thus, the frequency in the distribution system can be controlled at all times by exerting on the frequency-converter rotor a torque of proper direction and magnitude to provide the required rotor rotation. Preferably, I supply this torque by means of a reversible electric motor coupled to the frequency-converter rotor through speed-reduction gears and adapted to exert a torque in either direction upon the rotor. The means by which I regulate the magnitude and direction of this torque are hereinafter described.

Equipment of this type is much smaller and lighter than the motor-alternator sets frequency used to supply controlled-frequency power; hence, is cheaper both in first cost and in operating expense. The induction frequency converter operates pricipally as a transformer: its rotor normally rotates at relatively low speeds. Thus, the frequency-converter can be compactly built to operate at high efficiency, and special cooling means, such as oil immersion, can conveniently be employed. The motor which provides the required torque can also be relatively small, since the power which the motor must supply is only a small fraction of the power transferred to the distribution system. For example, if the distribution system requires ten kilowatts of electric power at a controlled frequency of sixty cycles per second, and the source supplies power at fifty-nine cycles per second, the motor must provide only one-sixtieth of ten kilowatts, or about 167 watts power, plus a small amount of friction losses. As compared to a motor-alternating system, the much smaller mass and speed of the rotating parts of my apparatus greatly reduce instability problems, and make possible the use of greatly simplified control equipment which does not include the elaborate servo-mechanisms, vacuum tube circuits, relays, or moving contacts heretofore employed, hence is more reliable and less costly to install and maintain.

Induction frequency converters have been previously used in frequency regulating systems, but such systems have heretofore depended for their operation upon the torque developed in the rotor of the frequency converter itself acting as an induction motor. This greatly restricts the application of such systems, as the torque so developed varies with the load presented by the distribution system. For example, under normal or heavy load conditions in the distribution system the frequency converter rotor usually develops sufficient torque that is must always be opposed by an external torque to maintain the desired low speed of rotation; and the external torque must always be in the same direction, but of varying magnitude, regardless of the desired direction of rotation. Under light-load conditions, however, the frequency converter rotor torque may become too small to overcome the friction required to rotate the rotor at the necessary speed and such a system then becomes inoperative to regulate frequency. Moreover, the incremental rotor torque versus frequency change is positive or negative, depending upon whether the load is capacitive or inductive, thus introducing instability problems, especially with highly inductive loads. By providing for a positive application of torque in either direction to the frequency-converter rotor, my apparatus effectively regulates frequency under all load conditions, and is operative whether the source frequency is higher than, equal to, or lower than the desired frequency in the distribution system. This permits operation of the source and the distribution system at equal average frequencies, with the source frequency varying either above or below the average, which is very desirable for power station applications. In practical cases, provision of a source frequency greatly different from the operating frequency, as required by many prior art systems, is generally objectionable.

In some cases my apparatus can be employed to regulate the frequency within a distribution system which itself contains alternators or other sources of electric power. This follows from the fact that in many such systems the transfer of additional power to the system will raise its frequency, while transfer of power from the system will lower its frequency. By changing the direction of applied torque, my apparatus can transfer power in either direction, and is thus well adapted for use in such situations.

Other improvements and advantages of my invention will become apparent as the description proceeds. The principal objects of my invention are the following:

It is an object of my invention to provide improved apparatus for regulating the frequency in an alternating-current distribution system.

It is another object of my invention to provide improved frequency-responsive regulating means for an induction frequency converter, adapted to exert a torque in either direction on the frequency-converter rotor.

It is another object of my invention to provide improved apparatus for regulating the frequency in an alternating-current distribution system, adapted to transfer power either to the distribution system or from the distribution system.

It is a further object of my invention to provide improved apparatus for regulating the frequency in an alternating-current distribution system which is simpler, lighter, and more compact than apparatus previously used.

It is a still further object of my invention to provide improved apparatus for regulating both instantaneous and average frequencies in an alternating-current distribution system.

It is another object of my invention to provide improved apparatus for regulating the frequency in an alternating-current distribution system which is substantially unaffected by load variations within the system.

It is still another object of my invention to provide improved frequency-regulating apparatus for an alternating-current distribution system which is highly efficient in operation and which requires no vacuum tubes, relays, or moving contacts.

It is another object of my invention to provide improved apparatus for regulating the frequency of an alternating-current distribution system adapted to have the source and the distribution system operate at substantially equal frequencies.

Figure 2:
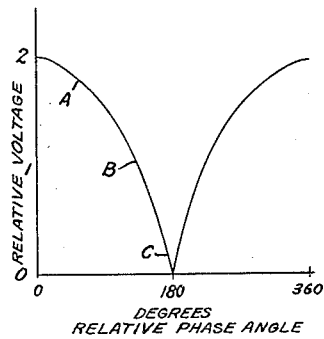
Figure 3:
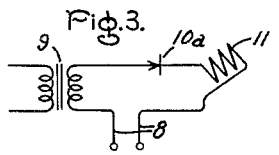
Figure 4:
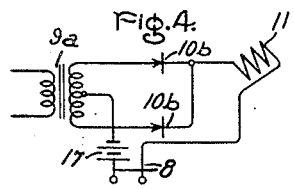

The features of my invention which are believed to be novel and patentable are pointed out in the claims appended hereto. For a better understanding of my invention, reference is made in the following description to the accompanying drawing in which Fig. 1 is a schematic diagram of a preferred form of my invention; Fig. 2 is a chart of voltage vs. phase shift which will be hereinafter explained; and Figs. 3 and 4 are schematic diagrams of alternative signal rectifying circuits which may be used with my invention.

Referring now to Fig. 1, an induction frequency converter 1 has stator windings 2 and rotor windings 3, respectively connected to a polyphase alternating-current source through terminals 4 and to an alternating-current distribution system through terminals 5. Although I have shown the stator windings connected to the source and the rotor windings connected to the distribution system, these connections may be reversed without affecting the operation of my invention. A torque in either direction can be applied to the frequency converter rotor by a direct current electric motor 6 connected to the rotor through speed reduction gears 7. Motor 6 could be coupled directly to the same shaft as the frequency converter rotor, but connection through reduction gears, as shown, is greatly to be preferred since the frequency converter rotor normally rotates at relatively low speeds, while motor 6 can be most efficiently operated at higher speeds.

A voltage of standard frequency, corresponding to the frequency desired on distribution system 5, is applied to terminals 8, and the primary of a transformer 9 is connected to the distribution system so that a voltage is induced in the transformer secondary whose phase is determined by a voltage in the distribution system. Transformer 9 and terminals 8 are connected in series so that the voltage induced in the transformer secondary and the standard frequency voltage applied to terminals 8 add or subtract, depending upon their relative phase relationship. The resultant voltage is rectified by a bridge rectifier 10 and applied to one field winding 11 of an amplidyne generator 12. The second field winding 13 of generator 12 is supplied with a direct current of constant value from a direct-current source connected to terminals 14, and the generator rotor is continuously rotated by motor 15. Resistor 16 is used to regulate the value of the current through winding 13 for purposes hereinafter explained.

Referring now to Fig. 2, I have shown the relative voltage applied to winding 11 plotted against the relative phase angle, in degrees, between the standard frequency voltage applied to terminals 8 and the voltage induced in the secondary of transformer 9. Preferably, transformer 9 should have a turns ratio such that these two voltages are approximately equal in amplitude. Thus, when the two voltages are in phase, or, stated differently, when the phase angle between the two is zero, the voltages will add, and the relative voltage across winding 11 will be twice that which would be present from either voltage alone. When the standard frequency voltage and the voltage induced in the transformer secondary are 180 degrees out of phase, one will subtract from the other and the voltage across winding 11 will be substantially zero. At intermediate phase angles, the voltage across winding 11 will have intermediate values, as is graphically shown in Fig. 2. Thus, the voltage across winding 11, and hence the current through the winding, is in effect a direct-current error signal, which varies responsive to changes in phase relationship between the standard frequency voltage and a voltage within the alternating-current distribution system.

For example, suppose that at any given instant the phase relationship between the voltage induced in the secondary of transformer 9 and the standard frequency voltage applied to terminals 8 is such that the voltage across winding 11 is represented by the point B on the curve shown in Fig. 2. This is an average value of such voltage and is a preferred normal operating point when the frequency of the source equals the frequency in the distribution system. This voltage across winding 11 produces a current through the winding which causes amplidyne generator 12 to deliver a predetermined amount of direct current to the armature of motor 6. This current flowing through the armature of motor 6 should produce a torque which has exactly the value required to hold the frequency converter rotor stationary. This can be realized by adjusting resistor 16, and thereby the current through winding 13, until the desired torque balance is obtained. The current in winding 13 is a biasing current which tends to oppose the current in winding 11 in its effect upon generator 12.

Now, if the frequency in the distribution system tends to increase by even a slight amount, the relative phase relationship changes so that the voltage induced in the secondary of transformer 9 leads the standard frequency voltage by a greater amount, and the voltage across winding 11 decreases. This may be shown in Fig. 2 by a shift towards point C on the curve. The decreased voltage across winding 11 causes generator 12 to deliver less current to motor 6; and this, in turn, reduces the torque exerted by motor 6 on the frequency converter rotor, and allows the rotor to rotate in a direction tending to lower the frequency in the distribution system. Similarly, a tendency of the frequency in the distribution system to fall causes a shift towards point A on the curve of Fig. 2, thus causing motor 6 to apply a greater torque to the frequency converter rotor to rotate the rotor in a direction tending to raise the frequency in the distribution system. Thus it is seen that the frequency in the distribution system is positively locked to the standard frequency, so that both the instantaneous and the average frequencies in the distribution system are maintained substantially at the standard value. Points A and C on the curve of Fig. 2 define the preferred limits of the operating range of my apparatus, showing that the maximum phase deviation is less than 90 degrees from the normal value. Thus, the possible frequency deviations are extremely small.

Those skilled in the art will perceive that numerous modifications of my apparatus are possible without departing from the true spirit and scope of my invention. For example, it is not necessary that the phase-responsive element include a bridge-type rectifier. For example, a circuit such as that shown in Fig. 3 may be employed, using a simple half-wave rectifier 10a. However, the use of a full-wave rectifying circuit is preferable, as a larger direct current and smaller alternating currents are thus obtained through winding 11. As another example, the circuit shown in Fig. 4 permits the use of a standard-frequency voltage having twice the frequency of the distribution system, which may be desirable in some cases. In this circuit, transformer 9a has a center-tap to permit full-wave rectification of the induced voltage by rectifiers 10b. However, the standard-frequency voltage undergoes half-wave rectification. Battery 17 provides a negative bias so that the rectifiers conduct only when the standard-frequency voltage and the transformer-secondary voltage are in additive phase relation. The well-known thyratron phase-responsive circuits may also be employed with my invention in applications where the use of thermionic tubes is not undesirable. It is also possible to use other methods for direct current amplification in place of the amplidyne generator, but I prefer the amplidyne over any other means which I have so far considered.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. A regulating arrangement for an induction frequency converter having stator and rotor members with relatively rotatable windings respectively connected to a polyphase alternating-current source and an alternating-current distribution bus, comprising means to provide a standard-frequency voltage, phase sensitive means including a rectifier to provide a direct-current error signal having a value determined by the phase relation of a voltage in the distribution bus to the standard-frequency voltage, an amplidyne generator having a field winding connected to said phase-sensitive means and energized by the direct-current error signal to provide a direct current output which varies responsive to variations in said error signal, and a reversible electric motor mechanically coupled to the frequency converter rotor, said rotor having a winding connected to and energized by said amplidyne generator so that the motor exerts a torque on said rotor which varies in magnitude and direction responsive to variations in said direct current output, thereby causing said rotor to rotate with the proper speed and direction to maintain voltages in the distribution bus in substantial synchronism with the standard-frequency voltage.

2. Frequency-regulating apparatus to connect a polyphase alternating-current source to an alternating-current distribution system and to maintain the frequency within such distribution system in substantial correspondence with a standard-frequency voltage, comprising an induction machine having stator and rotor members with relatively rotatable windings respectively connectable to the alternating current source and the distribution system, phase-sensitive rectifying means to provide a direct-current error signal having a value dependent upon the phase relation of a voltage within the distribution system to the standard-frequency voltage, bias-control means to provide a direct-current biasing signal, an amplidyne generator having one field winding connected to said phase-sensitive rectifying means and another field winding connected to said bias-control means, so that said amplidyne generator is responsive to a difference in magnitude between said error signal and said biasing signal and provides a direct current output which varies in magnitude and direction responsive to variations in magnitude of said error signal, and a reversible, direct-current motor, electrically connected to the armature of said amplidyne generator and mechanically coupled to the induction machine rotor, to exert a torque on said rotor varying in magnitude and direction responsive to like variations in said direct current output.

3. Frequency regulating apparatus to connect a polyphase alternating current source to an alternating current distribution system and to maintain the frequency in such distribution system in synchronism with that of a standard frequency source, comprising input terminals for connection to the polyphase alternating current source, output terminals for connection to the alternating current distribution system, an induction frequency converter having stator and rotor members with relatively rotatable windings respectively connected to said input terminals and said output terminals, a reversible, direct-current electric motor mechanically coupled through speed-reducing gears to the frequency converter rotor, said motor having field and armature windings connected for separate excitation, means to provide direct current through the field winding of said motor, an amplidyne generator having first and second field windings and an armature winding, the armature winding of said amplidyne generator being connected to supply current to the armature winding of said motor, rectifying means connected to supply direct current to the first field winding of said amplidyne generator, a transformer having a primary and a secondary, the primary of said transformer being connected to said output terminals, means including terminals for connecting the standard frequency source in series with the secondary of said transformer in voltage-supplying relation to said rectifying means, and bias-control means to supply an adjustable value of direct current to the second field winding of said amplidyne generator.

THOMAS T. SHORT.

REFERENCES CITED

The following references are of record in the file of this patent:

UNITED STATES PATENTS

| Number | Name | Date |
|---|---|---|
| 1,992,625 | Mathes | Feb. 26, 1935 |
| 2,352,620 | Edwards | July 4, 1944 |